United States Patent
Hofmann et al.

(10) Patent No.: US 6,954,172 B2
(45) Date of Patent: Oct. 11, 2005

(54) POWER MONITOR FOR RADAR SYSTEM

(75) Inventors: Pascal Hofmann, Ulm (DE); Robert Schneider, Burgrieden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/382,145

(22) Filed: Mar. 5, 2003

(65) Prior Publication Data

US 2003/0169198 A1 Sep. 11, 2003

(30) Foreign Application Priority Data

Mar. 7, 2002 (DE) .......................................... 102 09 927

(51) Int. Cl.$^7$ ........................... G01S 7/40; G01S 13/93; H01Q 1/42
(52) U.S. Cl. ....................... 342/173; 342/82; 342/165; 342/175; 342/195; 343/872
(58) Field of Search ................................ 343/872, 873; 342/70–72, 82–103, 1–11, 165–175, 192–197

(56) References Cited

U.S. PATENT DOCUMENTS

| | | | | |
|---|---|---|---|---|
| 4,097,796 A | * | 6/1978 | Lunden .................... | 342/165 |
| 4,145,692 A | * | 3/1979 | Armstrong et al. ........ | 342/173 |
| 4,486,756 A | * | 12/1984 | Peregrim et al. .......... | 342/174 |
| 5,163,176 A | * | 11/1992 | Flumerfelt et al. ........ | 342/174 |
| 5,172,122 A | * | 12/1992 | Peregrim et al. .......... | 342/174 |
| 5,172,124 A | * | 12/1992 | Becavin et al. ............ | 342/173 |
| 5,184,137 A | * | 2/1993 | Pozgay ..................... | 342/174 |
| 5,223,842 A | * | 6/1993 | Okurowski et al. ........ | 342/173 |
| 5,225,839 A | * | 7/1993 | Okurowski et al. ........ | 342/174 |
| 5,384,572 A | * | 1/1995 | Michaels et al. .......... | 342/169 |
| 5,412,414 A | * | 5/1995 | Ast et al. .................. | 342/174 |
| 5,485,159 A | * | 1/1996 | Zhang et al. .............. | 342/165 |
| 6,127,966 A | * | 10/2000 | Erhage ..................... | 342/174 |
| 6,275,182 B1 | * | 8/2001 | Meierbachtol ............ | 342/174 |
| 6,278,399 B1 | * | 8/2001 | Ashihara ................... | 342/173 |
| 6,392,586 B1 | * | 5/2002 | Thordarson et al. ....... | 342/169 |
| 6,414,623 B1 | * | 7/2002 | Ashihara ................... | 342/173 |
| 6,469,659 B1 | * | 10/2002 | Lajiness et al. ........... | 342/173 |

* cited by examiner

Primary Examiner—Bernarr E. Gregory
(74) Attorney, Agent, or Firm—Pendorf & Cutliff

(57) ABSTRACT

A method and corresponding devices for monitoring the performance of a radar system (2, 4) which is equipped with a shield 2 (radome) to protect it against weather influences are described. For this purpose, a part of the radiated radar signal is modified and fed as a monitor signal to the reception system after interacting with a coating (5) which is possibly present on the radom (2). Influences of a damping or reflecting coating (5) on the radom (2) change the monitor signal. By analyzing these changes it is possible to draw conclusions about the coating of the damping or reflection of the radar signals which is caused by the coating (5).

22 Claims, 3 Drawing Sheets

POWER MONITOR FOR RADAR SYSTEM

BACKGROUND OF THE INVENTION

1. Field of the Invention

The invention is concerned with the field of radar technology. In particular the invention relates to radar systems in which the irradiation or reception antenna is protected against weather influences by a front fitting.

2. Description of the Related Art

Radar systems with their ability to detect movement and determine distance and speed are operated in different fields of application. The antennas of the radar sensors are typically arranged directly behind a protective cover (radome). This cover can also be embodied as a lens of dielectric material for influencing the beam path (for example focussing) of the electromagnetic waves used. Contamination on this cover, for example due to dust, mud, ice, or sleet, can cause the propagation of signals to be impeded and thus adversely affect the detection power of the sensor.

Many applications, in particular those with a relevance for safety, have a certain minimum degree of sensor sensitivity and permanent and reliable monitoring to determine whether the sensitivity drops below these minimum values is necessary. To do this, standardized reflection objects (what are referred to as calibrators) can be used which are located in the capture range of the radar. A further possibility is to form statistics on the intensity and frequency of registered reflection signals and to infer changes in the sensitivity of the sensor from deviations. However, depending on the field of application, these methods are not practical and are too slow or too imprecise.

Thus, for example for applications in motor vehicles, not only comfort-related but also safety-related functions are being increasingly made available on the basis of radar sensor systems. Due o the specific environment and the installation position, it is particularly easy here for dirt, ice or snow on the radome to adversely affect the functional capability of the sensor.

In such a highly variable field of application with a number of sensed objects which varies in an irregular way, statistical methods are unsuitable, or at least problematic, for functional checking as both distances and speeds of the detected objects and their respective reflection characteristics may vary. Calibrators may be used basically only for stationary operating modes (as a defined target object at a predefined distance with known reflection properties), and can therefore not be used during mobile application.

In DE 196 44 164, a motor vehicle radar system is described in which a front fitting made of dielectric material is mounted in front of the antenna system, this front fitting having the function of a lens or of a radome. In order to detect soiling or a coating it is proposed to apply an electrically conductive arrangement made of two or more components which are electrically separated from one another on the external surface of the radome which is exposed to the weather. Changes in the electrical resistance and the capacitance between the separated components of the conductive arrangement which are brought about by adhering material (dust, ice, etc.) are measured arid ultimately enable conclusions to be drawn about the damping properties of the coating by way of the influence on what is referred to as the loss angle, which is calculated therefrom.

This device has various disadvantages:

Therefore the conductive arrangement, that is to say for example conductive tracks made of metal, is permanently exposed to weather influences. As, for functional reasons, the conductor tracks must not be insulated (resistance measurement), chemical factors (oxygen in the air, moisture, road gritting materials, etc.) and physical factors (UV radiation, stoning etc.) act intensively on the conductive arrangement. For this reason, as well as corrosion of the conductive material, it is also possible that the underlying dielectric surface may become detached or the conductor tracks may be mechanically damaged (stoning) and the arrangement suffer irreparable damage. In addition, the arrangement only supplies information relating to resistance values and capacitance values between conductor tracks which can be falsified by a large number of influences: a local electrically conductive bridge (insects, salt water spraying, soot particles, etc.) would, for example, be erroneously assigned to a distributed layer as a surface resistance.

An indirect calculation of damping properties of a coating on the basis of these measured variables is therefore associated with a relatively high degree of inaccuracy.

A drop in performance or failure in the radar system itself (for example due to a defect in the transmission/reception electronics) is not detected by the proposed arrangement. Additional measuring devices according to DE 196 44 164 are necessary for this.

The present invention is based on the prior art described in DE 196 444 164. The object of the present invention as to develop a new method and corresponding devices for improved monitoring of the power of a radar system which is equipped with a radome.

This object is achieved by means of a method for detecting a power-reducing coating (5) on a radome (2) of a radar system, said method comprising: feeding to a receiver of said radar system a monitor signal comprising a modified part of electromagnetic radiation emitted by said radar system and modified by interaction with said power-reducing coating and evaluating said monitor signal, whereby said power-reducing coating is detected, and by means of a device for detecting a power-reducing coating (5) on a radome (2) of a radar system, wherein said device comprises at least one element(3, 7, 9) for modifying part of the irradiated radar radiation and transmitting this part to a receiver device (4), each element (3, 7, 9) being arranged in such a way that the coating (5) present on the radome (2) influences the modified radiation. Further details and advantages of various refinements according to the invention emerge from the features of the subclaims.

SUMMARY OF THE INVENTION

According to the invention, by making modifications to the radar sensor or radome it is possible to ensure that components in the reception signal of the radar which interacted with a signal-damping or reflecting layer on the radome are displaced temporally or spectrally into regions of the radar reception range in which they can be identified and changes which occur can be analyzed.

BRIEF DESCRIPTION OF THE DRAWINGS

The method according to the invention and preferred devices for implementing the method are described in more detail below, reference being made to the figures and the reference numbers used; of said figures.

DETAILED DESCRIPTION OF THE INVENTION

In the method according to the invention, use is made of the fact that a disruptive layer (ice, snow, dirt, etc.) on the radome has different electromagnetic properties from that of the material of the radome. These properties are essentially described by complex dielectric constants and bring about a specific reflection and damping of the radar signal radiated by the antenna.

For example, wet snow, which particularly frequently leads to functional faults, has a high dielectric constant while at the same time having a high loss factor with a correspondingly high reflective and damping effect on the radio frequency signals used. However, it is not readily possible to directly sense this interaction with the layer on the radome as the layer is in the direct vicinity of the radar in which the detection of reflecting objects is not possible, or is possible only to a restricted degree. This is caused by direct coupling between the transmitter and receiver.

These problems are avoided by the method according to the invention in that components of the radiated radar signal which may interact with a layer on the radome are modified and fed back to the reception part of the radar system in such a way that these signal components can be reliably sensed and distinguished from other reception signals. To do this, these signal components are displaced temporally by predefined amounts and/or displaced on the frequency scale or modulated and are thus available as defined monitor signals an the reception spectrum of the radar system. Evaluating these monitor signals with respect to changes makes it possible not only to quickly and reliably detect the presence of a damping or blocking signal on the radome but also it can provide definitive information on the degree of damping or reflection at the layer on the radome.

Figure 1:
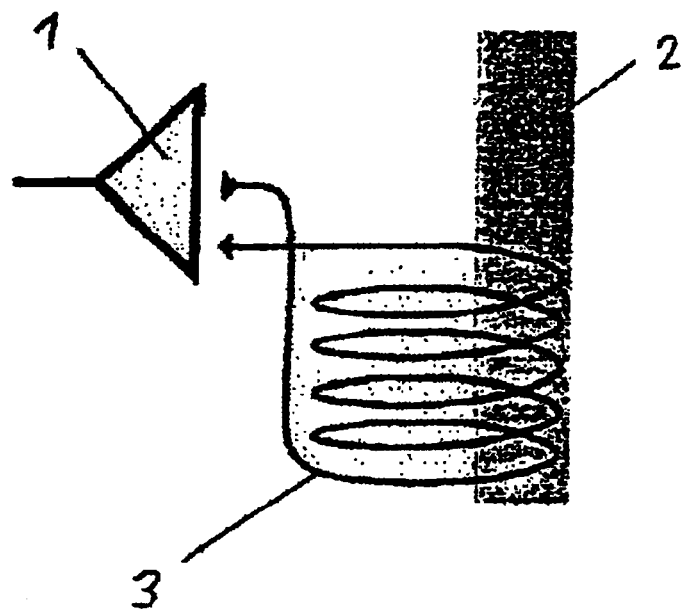
FIG. 1 shows a device for feeding the radar signal into a delay line on a monostatic radar system.

FIG. 1 shows a first exemplary embodiment for modifying signal components according to the inventive method. A monostatic radar system with just one antenna (1) which fulfills transmission and reception functions is represented. The radome (2) is located in the radiation direction at a relatively short distance in front of the antenna. Part of the transmission signal is fed into a dielectric delay line (3) which is represented here, for example, wound up into a helical shape in order to save space. After passing through the delay line, the signal is fed back to the antenna at the end of the line (in a monostatic radar system the delay line can alternatively be terminated in a reflective fashion at one end). The delay of the line is to be advantageously selected in such a way that the signal which is modified in this way is in the selectable region of the radar, i.e. corresponds to the signal of a detected object in the permitted distance range. Without the influence of a coating on the radome, a defined echo signal with a constant intensity and time difference, such as would be supplied by a calibrator for example, is therefore received. During ongoing operations, this signal thus fulfills the function of a continuously occurring monitor signal whose change can easily be detected.

Figure 2:
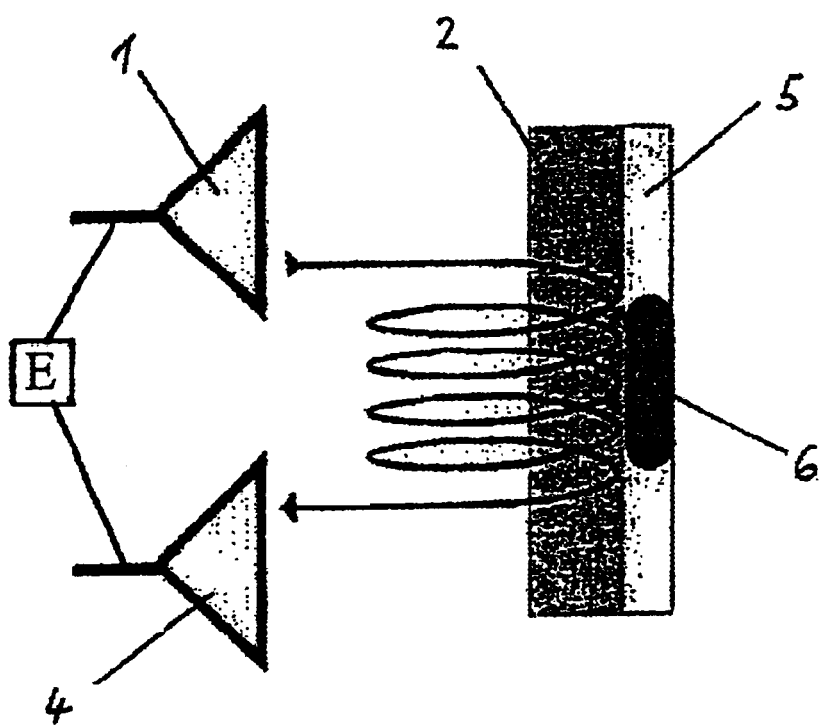
FIG. 2 shows a corresponding device on a biatatic radar system.

FIG. 2 shows the same principle as the exemplary embodiment for a bistatic radar system in which the transmission antenna (1) and reception antenna (4) are arranged separately.

As represented in FIGS. 1 and 2, the delay line (3) runs part of its length just under the radome surface. This means that in this region (6) a coating (5) on the radome (2) influences, due to its dielectric properties, the propagation properties on the delay line. This interaction with the radio frequency signal on the delay line (3) inevitably changes the monitor signal. If the evaluation in evaluation means (E) of the changed monitor signal also comprises details of the change (for example relating to the intensity, pulse propagation, time offset etc.), definitive information on the degree of influence (for example strength of damping or thickness and type of coating) can be derived, for example, by comparison with stored standard values.

In addition to the permissible sensing of a damping or reflective layer on the radome, this device implicitly provides, without additional expenditure, monitoring of the functionality of the radar system itself, as a failure of components of the radar system, whether in the transmission or reception part, automatically leads to a complete loss of the monitor signal.

An alternative possible way of feeding back signal components which are modified by a damping layer on the radome is to arrange individual or coupled resonant structures (7) (for example cavity resonator, planar ring resonator or patch, $\lambda/2$ dipole) in the radome (2), the resonant frequency of said resonant structures (7) being equal to the operating frequency of the radar. They are configured in such a way that, under excitation via the pulsed transmission signal, they experience post-oscillation, when undamped, for such a period that the decay of the oscillations occurs in the sensitive time range of the radar system. A damping layer on the radome brings about, for example, a drop in these signal components and can thus be detected. However, even a loss-free layer on the radome can be detected as it displaces the resonant frequency of the embedded structures and thus also leads to shorter post-oscillations.

Figure 3:
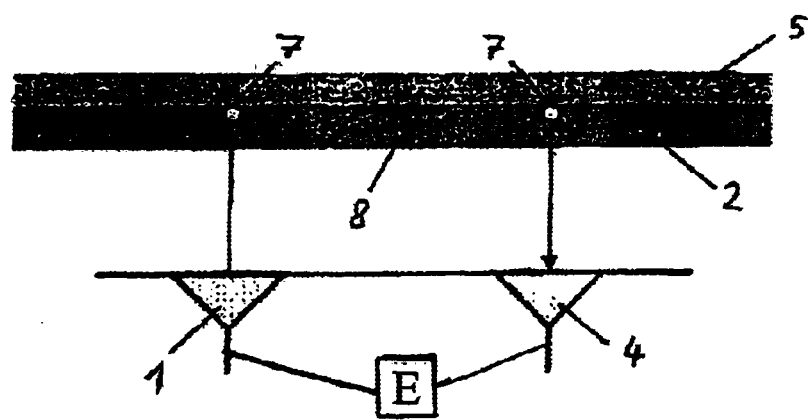
FIG. 3 shows an alternative device with dipole antennas in the radome as resonator.

FIG. 3 shows a specific embodiment of a bistatic radar system according to this principle, having two $\lambda/2$ dipoles (7) which are embedded in the radom (2) and whose spacing is selected such that a standing wave (8) is produced between them when a radom is coating-free. In this way, the two dipoles form a resonator which is excited to oscillate at its natural frequency whenever a transmission signal occurs. This natural frequency is picked up by the reception antenna (4) and can be evaluated in evaluation means (E) with respect to changes as a monitor signal.

Figure 4:
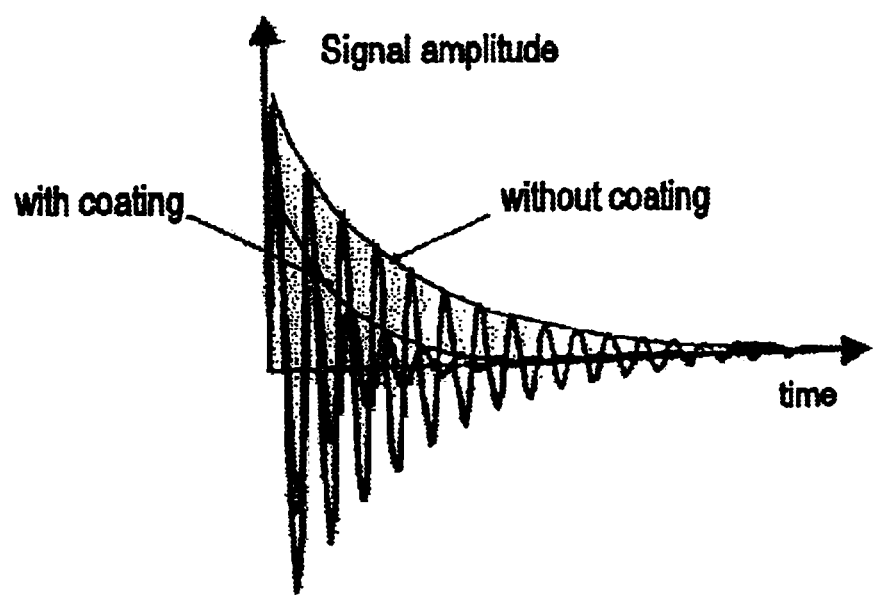
FIG. 4 shows a representation of typical evaluation signals on a device according to FIG. 3.

FIG. 4 is a schematic view of the decay of the resonant oscillation without damping (radome uncoated or free) and under the effect of a damping layer (5) on the radome (2). In this case also, the analysis of the monitor signal can include various parameters (amplitude, resonant frequency, quality, decay time, etc.) and definitive information on the properties of the current layer is acquired from said parameters by means of comparisons with stored values on the basis of measurements with standardized coatings on the radome.

The practice of feeding back signal components via resonant structures can also be used without restriction for monostatic radar systems and provides, in the same way as the device with a delay line described above, the possibility of continuous functional checking of the radar system itself.

A further possible way of detecting layers according to the inventive method is to modulate the radar layer signals reflected by the radome itself (and a layer possibly located on it) and thus separate this signal component spectrally from other signals or the direct couplings in the frequency spectrum.

Figure 5:
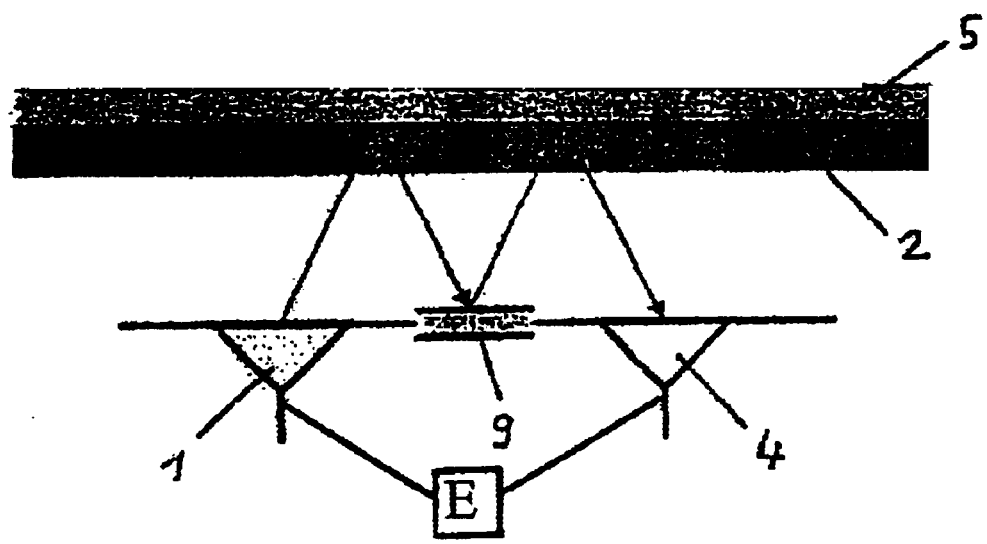
FIG. 5 shows an alternative device for modulating reflective radar signals.
Figure 6:
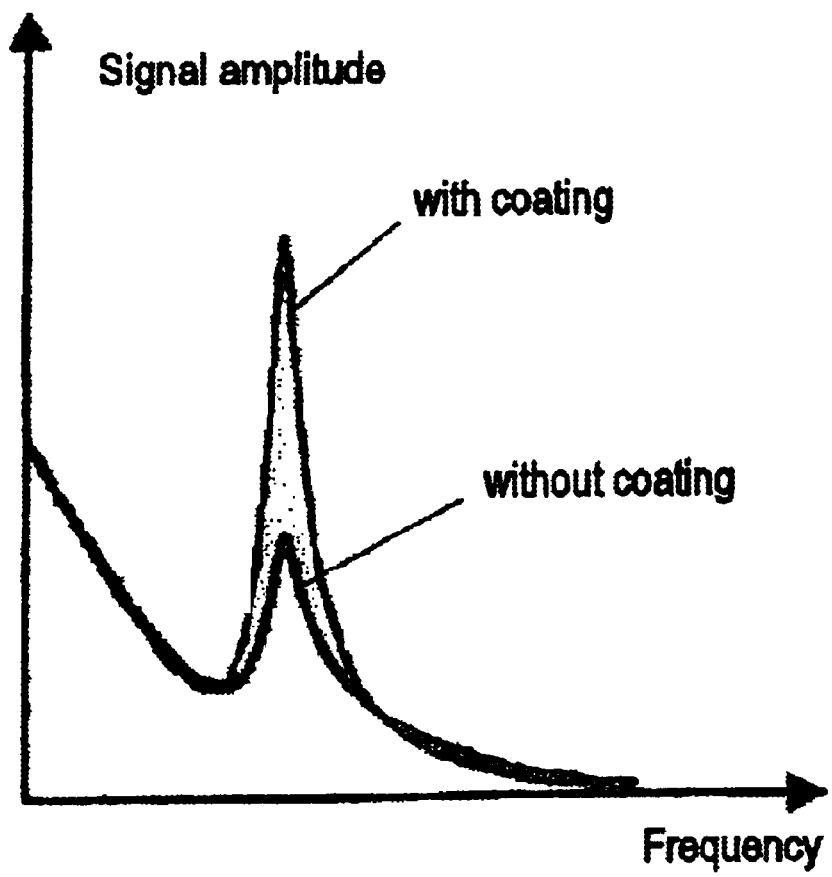
FIG. 6 shows a representation of the reception spectrum on a device according to FIG. 5.

FIG. 5 shows an exemplary embodiment. The signals irradiated by the signal antenna (2) are partially reflected by the radom (2) or a coating (5) located thereon and impinge on a modulator (9). This modulator may be embodied, for example, in mechanical form as a piezo element, as represented in FIG. 5. The impinging signal components are changed at the modulator (9), for example by frequency modulation (FM), and reflected back in the direction of the radom. From there the monitor signals which are generated in this way reach the reception antenna (4). The modulation range is advantageously selected in such a way that a narrow band FM with a spectral line at the modulation frequency is produced, the level of which frequency is proportional to the amplitude of the reflected signal. This monitor signal can be separated by means of a spectral analysis, for example Fast Fourier Transformation (FFT) and evaluated quantitatively in evaluation means (E). As represented in FIG. 6, when it is present in a reflective layer (5) the corresponding spectral component will have a higher amplitude in the reception spectrum (CW mode). Here too, wide-ranging definitive information on the damping and reflective properties of a coating on the radom can be acquired by means of qualitative and quantitative analysis of various parameters of the change in the monitor signal.

The arrangement according to FIG. 5 is equally suitable for pulse sensors and FMCW radar sensors. The method can also be applied for monostatic radar systems, the modulator then being located in the region of the antenna aperture or to the side of it. In principle, the mechanical modulator can also be replaced by an electrical one.

The method which is presented and the exemplary embodiments described permit reliable, continuous monitoring of the power and thus make a radar system with radome operationally capable. The direct influence of a coating on the radome on the radar signals is detected by modifying a part of the irradiated radar signals and feeding them back as a monitor signal. In this way, error influences, much as may occur as a result of indirectly determined measurement variables, are largely excluded.

As various parameters of a change in the monitor signal can also be evaluated qualitatively and quantitatively, a plurality of measured data items are typically available in parallel, it being possible to determine the effect of a coating on the radome at a particular time (in certain circumstances also in a redundant fashion) in a relatively precise way. Here, the evaluation can preferably also include stored comparison values of the influence of known layers (for example standardized layers) in the analysis.

The proposed devices can also easily be combined so that information on the influence of a coating can be acquired using various methods. For example, the device according to FIG. 2 (with delay line) can thus be combined with the device according to FIG. 5 (with piezo modulator). Such an arrangement would supply a first, time-shifted monitor signal which essentially reproduces the damping influence of the coating, and a second, frequency-modulated monitor signal whose amplitude is changed essentially by means of reflection properties of the coating.

The devices represented for converting the method according to the invention continuously sense the influence of a coating over part of the area of the radome. Given a corresponding configuration of the surf ace region, local contamination of the radome which is restricted only to a small area (insect, sprayed liquid, etc.) has no influence, or only very small influence, on the monitor signal.

All the devices described can easily be arranged in the internal region between the antenna system and radome so that all the components of an arrangement according to the invention for monitoring power are protected against weather influences (enclosed or encapsulated system).

In general terms, the method according to the invention additionally provides continuous monitoring of the functionality of the radar system itself, as a monitor signal with a known magnitude and frequency must always be present in the operationally capable state.

Owing to the abovementioned advantages, the proposed method and the corresponding devices are suitable not only for stationary radar systems but also in particular for use in mobile radar systems (motor vehicle radar systems etc.).

What is claimed is:

1. A method for detecting a power-reducing coating (5) on a radome (2) of a radar system, said method comprising:
   (a) feeding to a receiver of said radar system a monitor signal comprising a modified part of electromagnetic radiation emitted by said radar system and modified by interaction with said power-reducing coating; and
   (b) evaluating said monitor signal,
   whereby said power-reducing coating is detected.

2. The method according to claim 1, wherein a part of the electromagnetic radiation emitted by the radar system is modified by means of a time delay.

3. The method according to claim 1, wherein a part of the electromagnetic radiation emitted by the radar system is modified by means of frequency shift.

4. The method according claim 1, wherein a part of the electromagnetic radiation emitted by the radar system is modified by means of modulation.

5. The method according to claim 4, wherein the electromagnetic radiation is modified by means of frequency modulation of the frequency.

6. The method according to claim 1, wherein a part of the electromagnetic radiation emitted by the radar system is modified by being fed into resonant structures (7).

7. The method according to claim 1, wherein changes in the intensity of the monitor signal are evaluated.

8. The method according claim 1, wherein spectral changes of the monitor signal are evaluated.

9. The method according to claim 1, wherein changes in the time profile of individual monitor signals are evaluated.

10. The method according to claim 1, wherein stored data relating to standardized monitor signals are used to evaluate the monitor signals.

11. The method according to claim 1, wherein the monitor signals are used for functional checking of the radar system.

12. A device for detecting a power-reducing coating (5) on a radome (2) of a radar system, wherein said device comprises
   one or more elements (3, 7, 9) for modifying part of the irradiated radar radiation and transmitting this part to a receiver device (4), each element (3, 7, 9) being arranged in such a way that the coating (5) present on the radome (2) influences the modified radiation, and
   means for evaluating the modified part of the irradiated radar radiation received by the receiver device (4).

13. The device according to claim 12, wherein there is at least one element which is embodied as a delay line (3).

14. The device according to claim 12, wherein there is at least one element which is embodied as a resonant structure (7) for the transmitted radar radiation.

15. The device according to claim 14, wherein said at least one element which is embodied as a resonant structure (7) for the transmitted radar radiation is at least one of a ring resonator, a patch, a cavity resonator, and a dipole.

16. The device according to claim 12, wherein at least one element (3, 7) for modifying part of the irradiated radar radiation is mounted on or in the radome (2).

17. The device according to claim 12, wherein said at least one element (9) is a modulator.

18. The device according to claim 17, wherein the modulator (9) is arranged in such a way that it modifies the part of the radiated radar radiation which is reflected by the shield (2) or a coating (5) located thereon.

19. The device according to claim 17, wherein said modulator modulates at least one of frequency, phase, and amplitude.

20. The use of a device according to claim 12 for monitoring the power of a motor vehicle radar system.

21. A device for detecting a power-reducing coating (5) on a radome (2) of a radar system, wherein said device comprises at least one resonant structure (7) adapted to resonating at the frequency of the radar and experiencing post-oscillation for such a period that the decay of the oscillations occurs in the sensitive time range of the radar system, and arranged in such a way that the coating (5) present on the radome (2) influences the post-oscillations, and means for evaluating a drop in signal components received by the receiver device (4).

22. A device for detecting a power-reducing coating (5) on a radome (2) of a radar system, wherein said device comprises modulator means (9) arranged to modulate radar signals reflected from said radome (2) and to reflect the modulated radar signals back to the radome, a receiver device (4) for receiving said reflected modulated radar signals said modulator means being arranged in such a way that the coating (5) present on the radome (2) influences the modulated radar signals, and means for evaluating the modulated radar signals received by the receiver device (4).

\* \* \* \* \*